US010834062B2

(12) United States Patent
Androulaki et al.

(10) Patent No.: US 10,834,062 B2
(45) Date of Patent: Nov. 10, 2020

(54) UNLINKING OWNERSHIP OF SUCCESSIVE ASSET TRANSFERS ON A BLOCKCHAIN

(71) Applicant: International Business Machines Corporation, Armonk, NY (US)

(72) Inventors: Elli Androulaki, Zürich (CH); Angelo De Caro, Zürich (CH); Jens Jelitto, Rueschlikon (CH); Ilie Circiumaru, Luxembourg (DE)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 16/013,023

(22) Filed: Jun. 20, 2018

(65) Prior Publication Data
US 2019/0394179 A1 Dec. 26, 2019

(51) Int. Cl.
*H04L 29/06* (2006.01)
*H04L 9/06* (2006.01)

(52) U.S. Cl.
CPC ........ *H04L 63/0471* (2013.01); *H04L 9/0643* (2013.01); *H04L 2209/38* (2013.01)

(58) Field of Classification Search
CPC .................. H04L 63/0471; H04L 9/0643
See application file for complete search history.

(56) References Cited

U.S. PATENT DOCUMENTS

| | | | |
|---|---|---|---|
| 2016/0292672 A1* | 10/2016 | Fay | G06Q 20/363 |
| 2016/0300234 A1* | 10/2016 | Moss-Pultz | G06Q 20/3827 |
| 2017/0011460 A1* | 1/2017 | Molinari | G06F 21/645 |
| 2017/0046664 A1* | 2/2017 | Haldenby | G06Q 20/4016 |
| 2017/0046693 A1 | 2/2017 | Haldenby et al. | |
| 2017/0206532 A1 | 7/2017 | Choi | |
| 2017/0237554 A1 | 8/2017 | Jacobs et al. | |
| 2017/0262862 A1 | 9/2017 | Aljawhari | |
| 2017/0330174 A1 | 11/2017 | DeMarinis et al. | |
| 2017/0331896 A1* | 11/2017 | Holloway | H04L 9/12 |
| 2018/0130050 A1* | 5/2018 | Taylor | H04L 9/3247 |

(Continued)

FOREIGN PATENT DOCUMENTS

| | | | |
|---|---|---|---|
| WO | 2017027648 A1 | 2/2017 | |
| WO | WO-2017027648 A1 * | 2/2017 | H04L 9/3247 |

OTHER PUBLICATIONS

K. Toyoda, "A Novel Blockchain-Based Product Ownership Management System (POMS) for Anti-Counterfeits in the Post Supply Chain," IEEE Access, Jun. 28, 2017. doi: 10.1109/Access.2017. 2720760 ac. H. Wu, "A Distributed Ledger for Supply Chain Physical Distribution Visibility," Information 2017, 8(4), 137.

(Continued)

*Primary Examiner* — Vance M Little

(57) ABSTRACT

An example operation may include one or more of receiving an export identifier to initiate an asset ownership transfer of an asset from a current owner to a new owner, identifying an asset identifier assigned to the asset and a current asset ownership session stored in a blockchain transaction, responsive to identifying the export identifier, assigning a new asset identifier to the asset, assigning a random number to an import identifier used to identify the asset transfer to the new owner, and creating a new blockchain transaction including the new asset identifier, the random number, and a new asset ownership session.

20 Claims, 11 Drawing Sheets

(56) References Cited

U.S. PATENT DOCUMENTS

2018/0158054 A1* 6/2018 Ardashev ............. G06Q 20/389
2019/0057382 A1* 2/2019 Wright ................. H04L 9/0637
2019/0273725 A1* 9/2019 Allen ................. G06Q 20/0658

OTHER PUBLICATIONS

S. Abeyratne, "Blockchain ready manufacturing supply chain using distributed ledger." International Journal of Research in Engineering and Technology, 05(09), pp. 1-10, 2016.

Y. Yang, "Mechanisms for Validating Authorization/Delegation Hierarchy Using Blockchain Technology." IP.com Disclosure No. IPCOM000248695D. Publication Date: Dec. 27, 2016.

\* cited by examiner

UNLINKING OWNERSHIP OF SUCCESSIVE ASSET TRANSFERS ON A BLOCKCHAIN

TECHNICAL FIELD

This application generally relates to asset transfers on the blockchain, and more particularly, to maintaining an immutable ledger and establishing provenance of transactions tied to assets transferred between parties while providing anonymous ownership information in an otherwise linked blockchain data service for providing unlinking ownership of successive asset transfers on a blockchain.

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in the blockchain blocks, which are secured from tampering and revision due to their immutable properties. Each block contains a timestamp and a link to a previous block. A blockchain can be used to hold, track, transfer and verify information. Since blockchains are a distributed system, before adding a transaction to the blockchain ledger, all peers need to reach a consensus status.

Conventionally, transfers of assets is a common use-case in blockchain systems. Data privacy in such systems refers to the protection of transaction details of transactions included on the blockchain. In general, such owner/seller/buyer information is included in the blockchain transactions stored on the blockchain. However, revealing entities that were included in the current state or previous states of a certain asset could reveal private business collaborations which may be sensitive if revealed to the wrong parties.

SUMMARY

One example embodiment may provide a method that includes one or more of receiving an export identifier to initiate an asset ownership transfer of an asset from a current owner to a new owner, identifying an asset identifier assigned to the asset, a random number assigned to the asset, and a current asset ownership session stored in a blockchain transaction, assigning a new asset identifier to the asset, and creating a new blockchain transaction comprising the new asset identifier, the random number, and a new asset ownership session.

Another example embodiment may include a method that includes one or more receiving an export identifier to initiate an asset ownership transfer of an asset from a current owner to a new owner, identifying an asset identifier assigned to the asset and a current asset ownership session stored in a blockchain transaction, responsive to identifying the export identifier, assigning a new asset identifier to the asset, assigning a random number to an import identifier used to identify the asset transfer to the new owner, and creating a new blockchain transaction comprising the new asset identifier, the random number, and a new asset ownership session.

Still another example embodiment may include a system that includes a computing node configured to receive an export identifier to initiate an asset ownership transfer of an asset from a current owner to a new owner, identify an asset identifier assigned to the asset and a current asset ownership session stored in a blockchain transaction, responsive to the export identifier being identified, assign a new asset identifier to the asset, assign a random number to an import identifier used to identify the asset transfer to the new owner, and create a new blockchain transaction comprising the new asset identifier, the random number, and a new asset ownership session.

Still yet another example embodiment may include a non-transitory computer readable storage medium configured to store instructions that when executed cause a processor to perform one or more of receiving an export identifier to initiate an asset ownership transfer of an asset from a current owner to a new owner, identifying an asset identifier assigned to the asset and a current asset ownership session stored in a blockchain transaction, responsive to identifying the export identifier, assigning a new asset identifier to the asset, assigning a random number to an import identifier used to identify the asset transfer to the new owner, and creating a new blockchain transaction comprising the new asset identifier, the random number, and a new asset ownership session.

DETAILED DESCRIPTION

Figure 1:
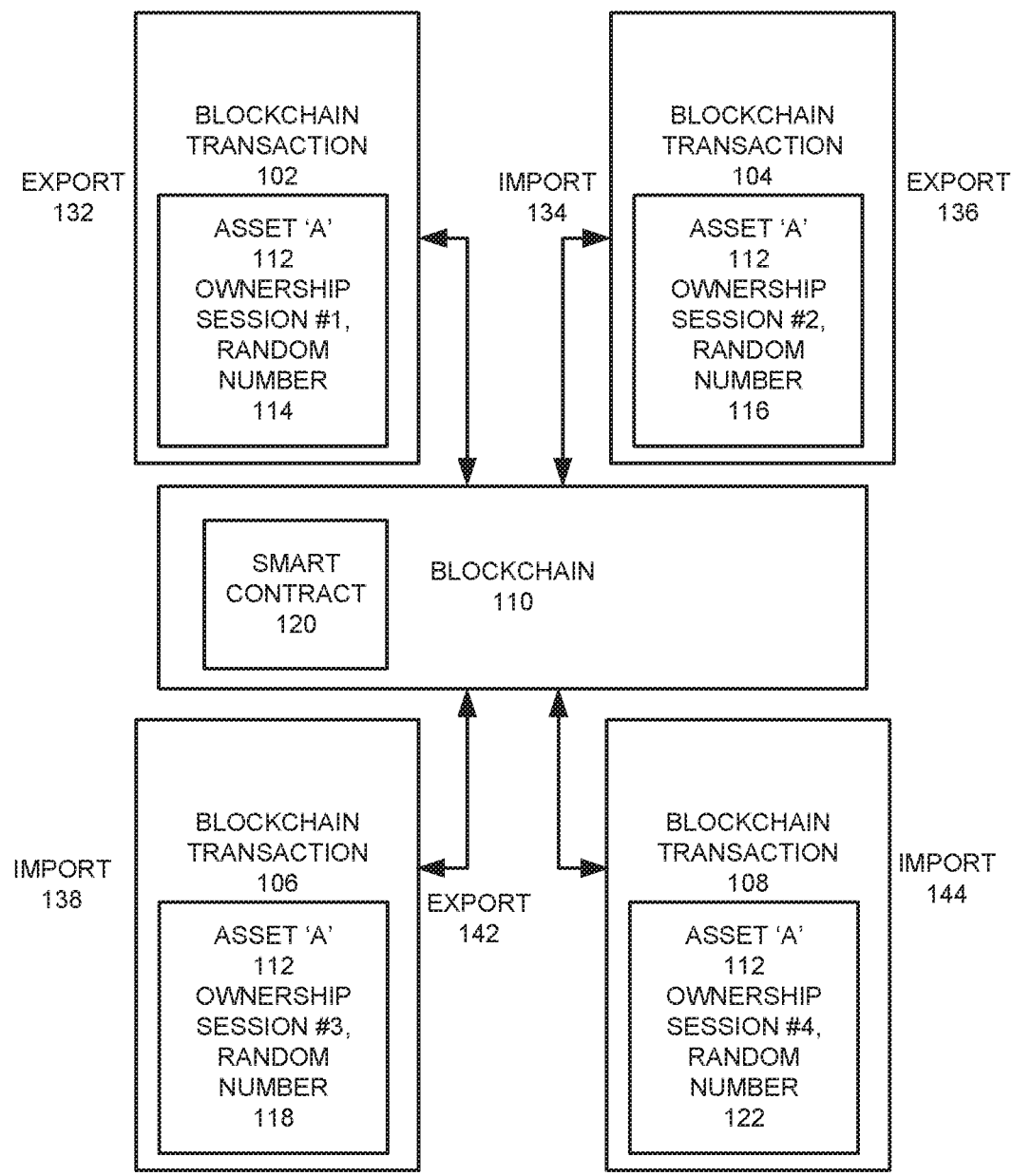
FIG. 1 illustrates a set of asset transfer transactions among various different owners on a blockchain, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, devices, networks and/or systems, which support data transactions and related data records stored in a computer-based server on a blockchain data network to have current and/or new owner information associated with the asset which is unlinked so consecutive owners of an asset cannot be identified by an auditor of the blockchain transaction. In general, new owners of an asset whom have recently taken possession of an asset by a current blockchain transaction, can usually trace back previous owners of the asset for provenance reasons. However, in this configuration, the new owner may not be able to identify any of the previous owners of the asset.

Product and/or asset identifiers may be used in supply chain networks and may also be necessary to organize data on the blockchain. In supply chain operations, products/assets with a need for traceability are typically assigned a unique identifier (e.g., a serial number), which can be used to trace the product's origin throughout the product/asset lifespan. In order to ensure uniqueness of the identifiers, certain organizations provide standards to enable those organizations to assign identifiers to products, documents, physical locations and other data for use on a global scale. The unique identifiers and/or numbers are required to comply with the standard. In particular, the unique identifier (UI) of a product typically includes several parts: [Organization Identifier], which is a string acting as an identifier of the organization that is producing an item, which may also contain location information for the production site, such as a tag denoted: <organization, location>, such identifiers may also be configured as a 'commissioner-ID, [Product Description], which is a description of the specific product, such as its packaging conditions, color, etc., and this can be referred to as a product description. Other identifiers include a [Serial Number], which is an identifier of a specific instance of a specified product (e.g., one package of a certain medicine), and this will be referred to as a serial number (SN). After the registration of a product by the product description, the owner of that product can commission instances of the product that are covered by that product description (GTIN).

In product commissioning with serialization, a product is declared to exist and is assigned a serial number (SN). The combination of the organization that produces an item, commissioner-ID, product description, and its serial number SN, form a unique identifier (UI). In the physical world case, the product UI is essentially attached in some form to the product itself. After a product has been commissioned it can be "shipped" and transferred to a target destination and will finally "arrive" at its new owner. During the data transfer, the product may be assigned to one or more custodian accounts (e.g., shipping, receiving organizations, etc.) that would be responsible for the transportation of the product to certain intermediate destinations. Custodians would also keep track of the product's condition/state. Arrival of the product is a two-step process, which first provides the current product custodian acknowledging the arrival of the product to the interested parties, and the new owner to accept and acknowledge receipt of the product/asset. Traditionally, this process is performed manually, for instance, the custodian presents the new owner a paper contract and after physically inspecting the package would then sign for transfer of ownership. The new owner can be a distributor entity that is supposed to ship the asset to another destination. In this case, the product would be again shipped, and its transportation monitored by the set of custodians that the new owner decides to engage. Finally, the product is dispensed and sold to consumers and is no longer available to the supply chain world. With regard to privacy and security requirements in the supply chain networks, at each point of a product's lifecycle, serial numbers are attached to each product, usually digitally, and stored in an online database, to ensure that the product can be easily tracked. If these serial numbers cannot be forged/copied elsewhere, then the numbers can prove the origin and authenticity of the product itself.

During the lifetime of a product, an owner is authorized to access all status information of a particular product until the point that the product's ownership changes to another owner. Owners of products are also authorized to access information regarding previous owners of the product since the time the product was commissioned. Visibility of a product owner with regard to product activity, is not extended to activity caused by subsequent owners of the product. During a supply chain delivery order, intermediate destinations are authorized to access data associated with a product state from the moment the shipment of the product started, until their role in the transport of the product completes.

In one example embodiment, a supply chain management operation may be performed to detect serial number duplicates and prevent their re-use, while ensuring that a certain asset can only be transferred to exactly one party. Other features include disassociating a sequence of owners of the certain asset to prevent certain entities, that can access that blockchain transaction data, from accessing the ownership information without restricting future owners of the data/ asset from detecting validity of the ownership chain until the ownership changes. For registration, a blockchain representation of the asset data may include serial numbers, such as the commissioner-ID and/or the item-ID, commitment data on the product-description, etc. Given that the identification suite: <commissionerid, item-id> should be unique across other blockchain serial numbers, revealing that information provides for countermeasures against asset "double-using" misuse.

In operation, de-commitment information to retrieve the actual serial number (SN) from the blockchain SN may be passed from an owner to another newer owner, such that any owner is able to confirm the authenticity of a certain item without specific references to a person's profile or an organization's profile. In one example, the life of a commissioned product is divided into certain "ownership sessions". The owner of an item does not change throughout an ownership session, and when the owner does in fact change, then the asset moves to a new ownership session. In each ownership session, the item acquires a new identifier, that is coupled with its current owner's information. At the end of a session, the current owner of an item issues an "export" operation to export the item from its current ownership status. The export operation is accompanied with an "export ticket", which when identified causes the application to bind the export operation to the next owner of the asset in a way that is not visible to third parties likely to audit such information. In this manner, datachain provenance is preserved in the blockchain transaction chain without having ownership information being identified outside the ownership session.

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

FIG. 1 illustrates a set of asset transfer transactions among various different owners on a blockchain, according to example embodiments. Referring to FIG. 1, the example 100 illustrates a set of blockchain transactions occurring over time responsive to various export 132/136/142 and import operations 134/138/144. In the first transaction 102, the contents of the transaction include details regarding the asset 'A' 112, the current ownership session #1 and a random number associated with the asset and the session 114, which serves as a reference to the asset, its previous owner and its current owner. When an export operation is performed 132, the current owner is attempting to vacate the asset and have it transferred to the next owner subject to an agreement. The next owner will initiate an import operation 134 and the next blockchain transaction 104 will be created and stored in the blockchain 110 subject to the terms of a smart contract 120.

The asset information 'A' will be preserved, however, a new unique identifier will be assigned along with a new session #2 and the same random number 116, or a variation of the random number that is traceable back to the original owner is used as a hidden descriptor with undetectable lineage so the auditors of the information can identify the transaction without identifying the parties to the asset's ownership history. Eventually, the current owner will export the asset, subject to a transfer agreement, to another owner in a new blockchain transaction 106, via an import operation 138 that causes another transaction to be created with the same asset and a new session with the same random number information 118. Subsequently, the same transfer process may happen again where the export operation 142 causes a new transaction to be created 108 for the next session #4 subject to an import operation 144 being performed to cause the transaction to include the random number and the new session information 122.

Random numbers may be used to uniquely identify an asset and also to generate an export/import ticket. In the example of FIG. 1, the different random numbers are assigned to different import/export operations. The random number used to uniquely identify an asset is assumed to be unique per asset, so as long as the asset exists and does not change, the random number assigned to that asset should be the same random number for all blockchain transactions. However, the random number that is used to generate the import/export ticket is a new random number assigned each time a new export operation (i.e., transfer) takes place.

In an example of supply chain data being incorporated into blockchain data, assuming a collision resistant hash function, the export ticket may have the following form: exportTicket=Hash(newOwnerID, importTicket, randomNumber), where the newOwnerID is the long-term identity of the new owner, the importTicket is used by the new owner to import the asset to its new ownership and the randomNumber sufficiently hides the relationship between the exportTicket and the importTicket. During export, the importTicket and the randomNumber are passed to the new owner using an existing encryption, such as an existing public key infrastructure (PKI). As soon as the export operation completes, an import operation follows performed by the new owner. The import operation signifies the beginning of a new ownership of the existing asset and a new session associated with that asset. The import operation requires an import ticket to be declared that is unique across all 'importTickets' for that the same owner. Successive owners may obtain access to the random number and can easily trace back the sequence of operations that led to the asset being transferred to their possession transaction.

Example embodiments permit for the representation of supply chain operations and also permit detection of product duplicates identified. For example, a certain asset can only be owned by one party and transferred to exactly one party at a time in the blockchain. The asset will be used synonymously with an instance of a product identified by a unique identified (UI). When the asset needs to be disassociated with a current owner, the sequence of owners of the asset and the blockchain transactions associated with the product lifecycle may still be recorded in a common transaction repository. However, unauthorized parties may be excluded from deriving information provided by other parties in the blockchain, but in a manner that does not restrict future owners of the product to be able to verify the validity of the ownership chain. Secure product commissioning may be performed so that the product is assigned a correctly formed UI, such as when the global trade item number (GTIN) included in the commissioned product's UI (e.g., combination of organization identifier and product description) has been reserved/declared/owned by the organization who commissions the product and that the serial number appearing in UI of the commissioned product is unique among the commissioned products with the same GTIN. Secure commissioning may require the secure GTIN reservation or declaration by an organization, that would ensure that the organization identifier in the reserved GTIN matches the organization who requested and declared that GTIN. This can be ensured by determining, upon the GTIN reservation requests for the identity of the creator of the request, that there is a match of the requested GTIN organization identifier with the expected identifier. After a GTIN is declared, commissioned products can reference that GTIN. More specifically, during the commissioning of a product, a UI is assigned to the product that includes a declared GTIN and a serial number. To secure this process, the GTIN needs to be guaranteed and declared by a product commissioner, and the serial number must be unique for that GTIN. Privacy requirements add other restrictions, as the number of products that correspond to a specific GTIN would need to be concealed to third parties.

To enforce commissioned products being given correctly formed UIs while hiding public entities, the commissioner can provide the UI in two parts: a commitment to GTIN and/or cGTIN, using a randomly generated number 'R', and a serial number (SN) randomly selected. The UI related components are also enhanced with a ciphertext of 'R'. The GTIN is identified to be included in one of the already declared GTINs of the organizational identifier that the commissioner corresponds with. This can be achieved with any known set intersection scheme. In one example, a description field of the GTIN may be shown to be included in the cGTIN as a member of a set {GTINi.Product-Description} for all i for which GTINi is in commissioner's GTIN list. During the validation of a commissioning request validation, the proof is needed together with a check that the SN has not appeared before in the commissioner's list. The cGTIN is the result of a hiding and binding commitment function applied to the GTIN. Essentially, the cGTIN is a version of the GTIN that obfuscates the GTIN's actual value. When an organization issues a GTIN for a product, asset permission is obtained to issue products that are subjected to the product description included in the GTIN. However, the organization may desire to hide how many products are issued under that description. This is why a newly commissioned product may contain a cGTIN instead of a GTIN, and a serial number that should be unique within the products of that organization. Advanced cryptography primitives can be used for the organization commissioning the product to prove that the GTIN corresponding to the cGTIN has been issued by that organization. The random number is needed for one to move from GTIN to cGTIN and backwards. For auditors and recipients of products that need to track the product and its condition, having knowledge of the random number is the feature necessary to identify such products in the blockchain.

With regard to an unlinkable and secure product ownership sequence, each possible owner of assets may be assigned to a unique namespace. An asset can only be associated with one owner/namespace at a given point in time. The time during which an asset stays with an owner as an ownership session may also be defined. In this way, the life of a commissioned asset is divided into ownership sessions. When asset ownership changes, the asset moves to a new ownership session. For the sequence of ownership of an asset to be unlinkable to parties observing blockchain transactions, in each ownership session conducted, the asset acquires a new identifier that is linked to its current owner. The namespace is used as a way to divide/classify/group together assets available or 'active', and which have not yet been exported and included on the blockchain. As an asset is assigned to each potential asset owner in the blockchain, such as user 'A', 'B', etc., a unique namespace (i.e., an identifier) is used to identify the asset to the owner. An asset owned by A would then be referencing the namespace of A, such as 'A' NS, and each asset owned by B would reference that user's namespace, such as 'B'NS. Subsequently, an asset that is transferred (i.e., changes ownership), needs to be exported from one namespace and imported for assignment to the other namespace. The globally unique identifier (GUID) is generated for an asset based on its commissioning time, and needs to include the global identifier of its owner (i.e., party that performed the commissioning).

At the end of any one particular asset ownership session, the owner of an asset issues an "Export" operation to export the item from its current ownership. The export operation of the 'i' th ownership session is accompanied with an "export ticket", that binds the export operation to the next owner of the asset in a way that is not visible to members of the blockchain network that are not direct parties to that particular asset transfer blockchain transaction. In particular, assuming a collision resistant hash function, an export ticket for the Tth session of an asset's life has the following form: exportTicket_i=Hash(ownerID_$\{i+1\}$, importTicket_i, randomNo_i), where ownerID_$\{i+1\}$ is the long-term identity of the new session's owner, where importTicket_i is used by the new owner to "import the item to its ownership", and randomNo_i sufficiently hides the relationship between an ownerID_$\{I+1\}$, exportTicket_i and an importTicket_i, to the ones who have access to the blockchain data. During the export function, importTicket_i and randomNo_i are properly passed to the new owner using an existing PKI. As soon as the export operation completes, an import operation follows as performed by the new owner. This signifies the beginning of a new ownership session of the asset. The import operation requires an import ticket to be provided that should be unique across all import tickets of the same owner. By construction, there is one export ticket and one import ticket matching a particular owner ID. Successive owners will obtain access to a randomNo_i, and can trace back the sequence of operations that lead the asset to their current ownership.

In another feature associated with the example embodiments, a hierarchical encryption mechanism may be used to honor access rights. For example, an asset's representation on a blockchain can minimally include any of the following fields: asset owner, where the owner of an asset is expressed by its long-term identities, asset ID, where a reference to a specific asset within a namespace asset UID type of information, which includes information on the long-term UI of the asset and the asset transfer data, information on the transfer conditions of the asset, which would be information associated with the current transfer that the asset is subjected to at a particular time, and asset description which is information on the description of the asset, which would be long-term information on the asset available to all subsequent owners of the asset. Identity of the asset owner is represented by the namespace of the asset(s). Asset ID is also on a per-namespace and asset basis, and is available to all the parties that have access to where the blockchain asset state resides. Asset UID should remain concealed from the entities that are not involved in the asset's transfer. Otherwise, the UID field would act as a way to trace operations taking place on the same asset on the blockchain. In fact, asset UID is required to be available to entities that are authorized to detect the authenticity of the asset back to its origin, and is therefore subjected to selective access. Asset transfer data is required to be accessible by current and subsequent custodians of the asset in the current transfer session, while the asset transfer description should be available to current and subsequent owners of the asset. For example, an asset authenticity check is part of the long-term information included in the asset-description.

It may be assumed that during an ownership session of an asset, the asset is still subjected to multiple transfers, such as trips to distributors operated on common ownership network. Each transfer is divided into two or more legs, that would denote the time period during which the asset is subjected to the same custodian in the transfer. Operations taking place may include session/transfer/leg, etc. At the beginning of each ownership session a new long-term key would need to be generated (i.e., MKI), that would be used to encrypt any import specific information including a randomNo_i, as well as previous long-term key information MK_$\{i-1\}$. At the beginning of the $k^{th}$ leg in a transfer session (transfer_$\{i, j\}$), a new ephemeral key is generated, such as K_$\{l\_k\}$, which is used to encrypt transit related information of the asset. If k>0, and this is not the first leg in the transfer, then K_$\{l\_k\}$ is used to wrap the corresponding key of the previous leg, K_$\{l\_\{k-1\}\}$, and from that point onwards, the status of the asset during the duration of leg l_k, K_$\{l\_k\}$ is disseminated to the current custodian of the asset, which should use that key to encrypt any asset status related information. If k=0 and this is the first leg in the transfer, then no wrapping takes place. Eventually, ownership session keys are wrapped with a current owner's key, while transfer related keys are encrypted under the current custodian, and next destination keys, if the latter has been specified. Because of the chain relationship between keys, which is based on the wrapped keys, an owner obtains access to the long-term information of previous ownership sessions of the same asset, and to most recently transferred data. An asset's custodian also obtain access to the current leg's transfer data and all the data associated therewith to all the legs preceding the current leg in the transfer.

Figure 2A:
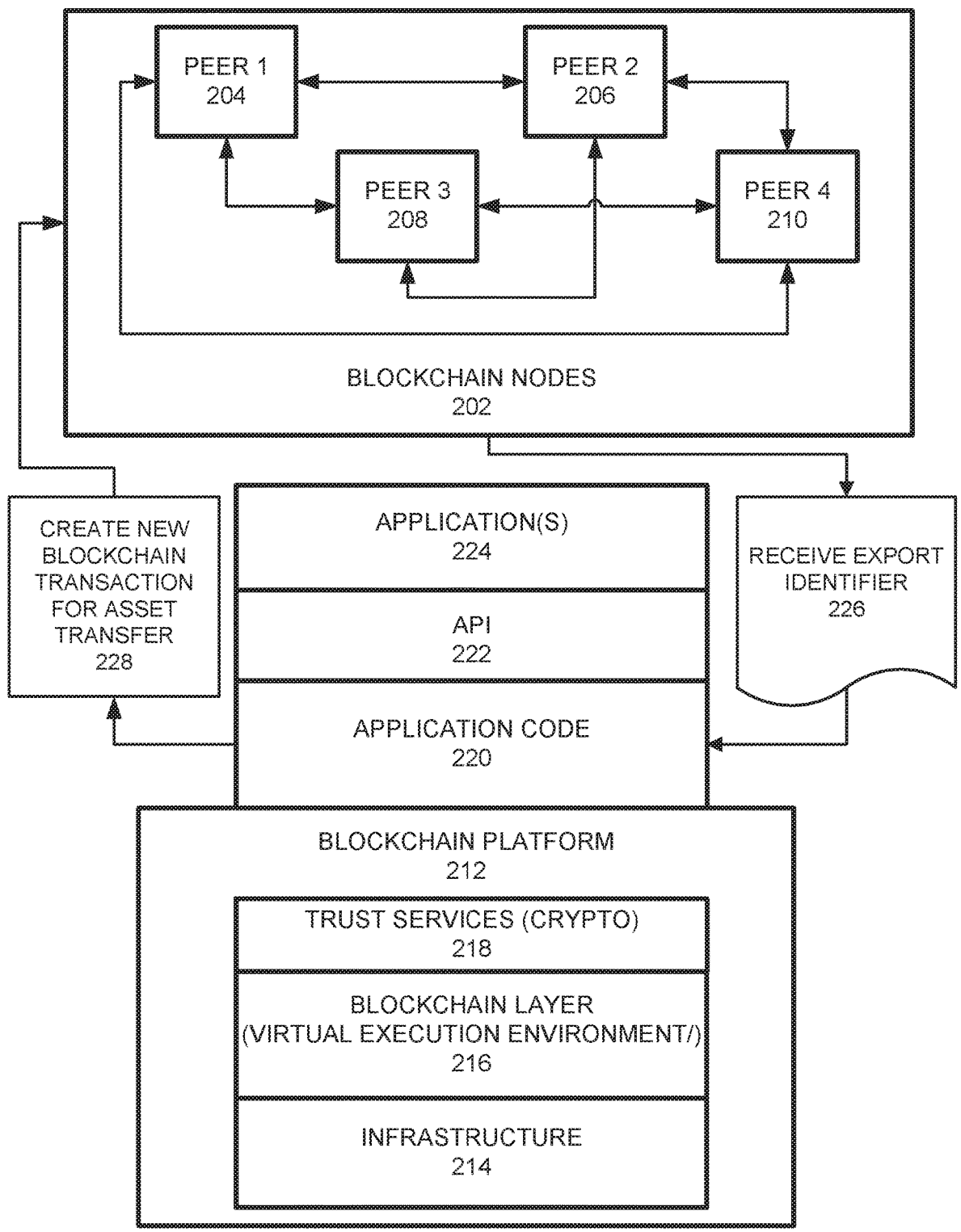
FIG. 2A illustrates an example peer node blockchain architecture configuration for asset transfer management, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (four nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications which are linked to application programming interfaces (APIs) to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, in one example, certain export operation triggers may be received 226 and processed with instructions in the smart contract application code. This may trigger a consensus decision with regard to identifying the new transaction and notifying interested parties of the new asset status transaction 228. The consensus may be performed to commit transactions for updates, failures, successes and other information reports which must be kept in the immutable ledger during the activities.

Figure 2B:
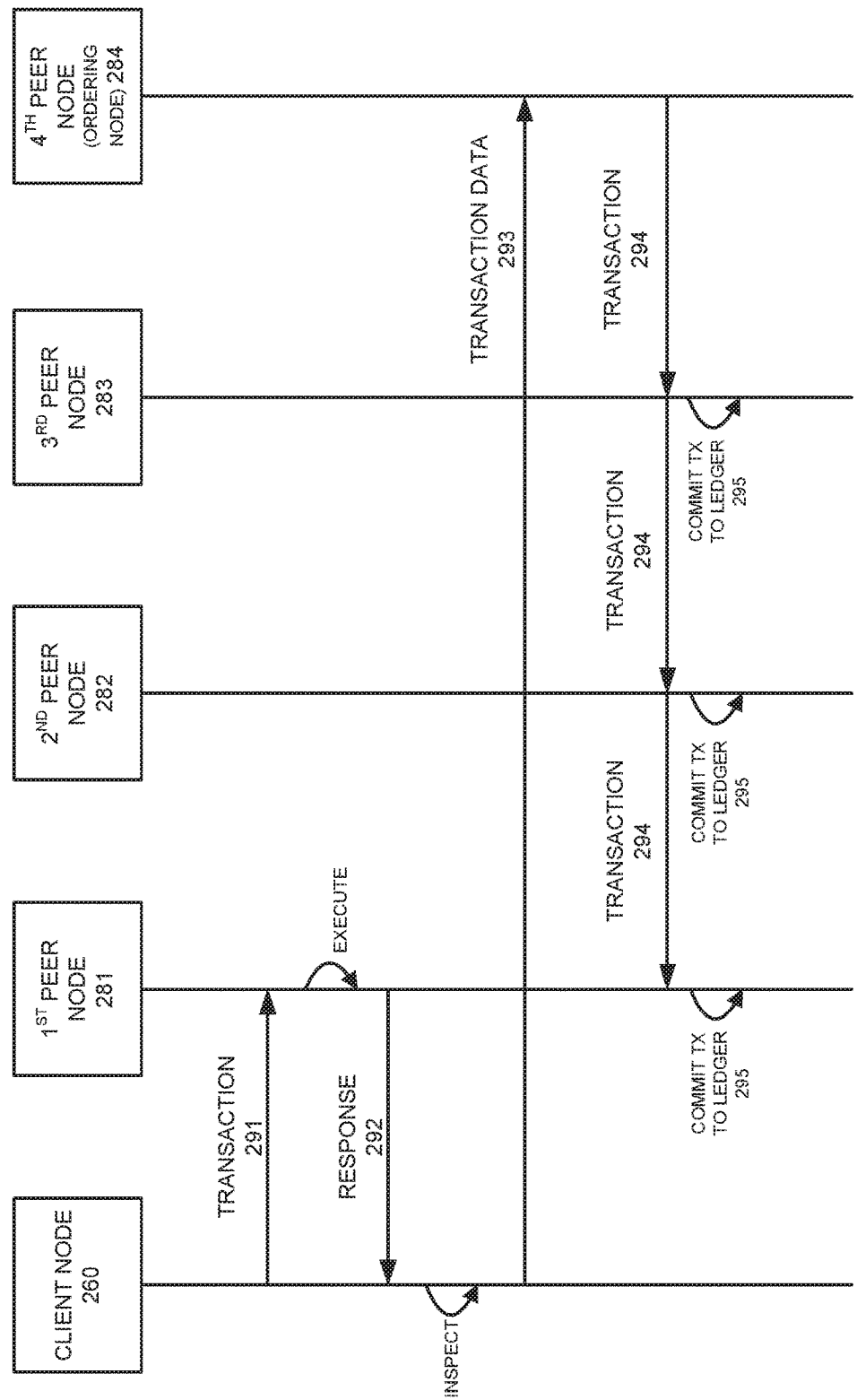
FIG. 2B illustrates an example peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
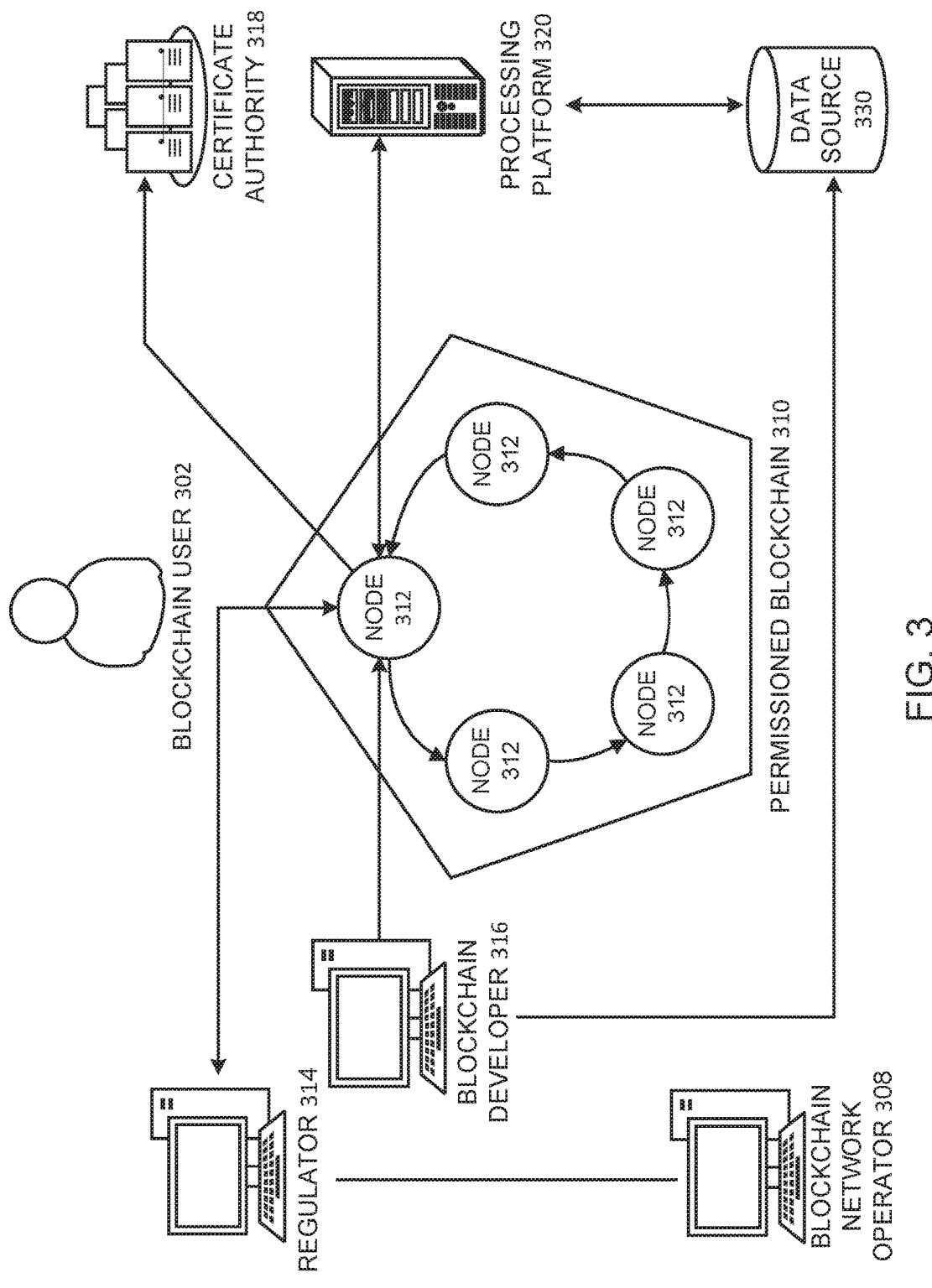
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
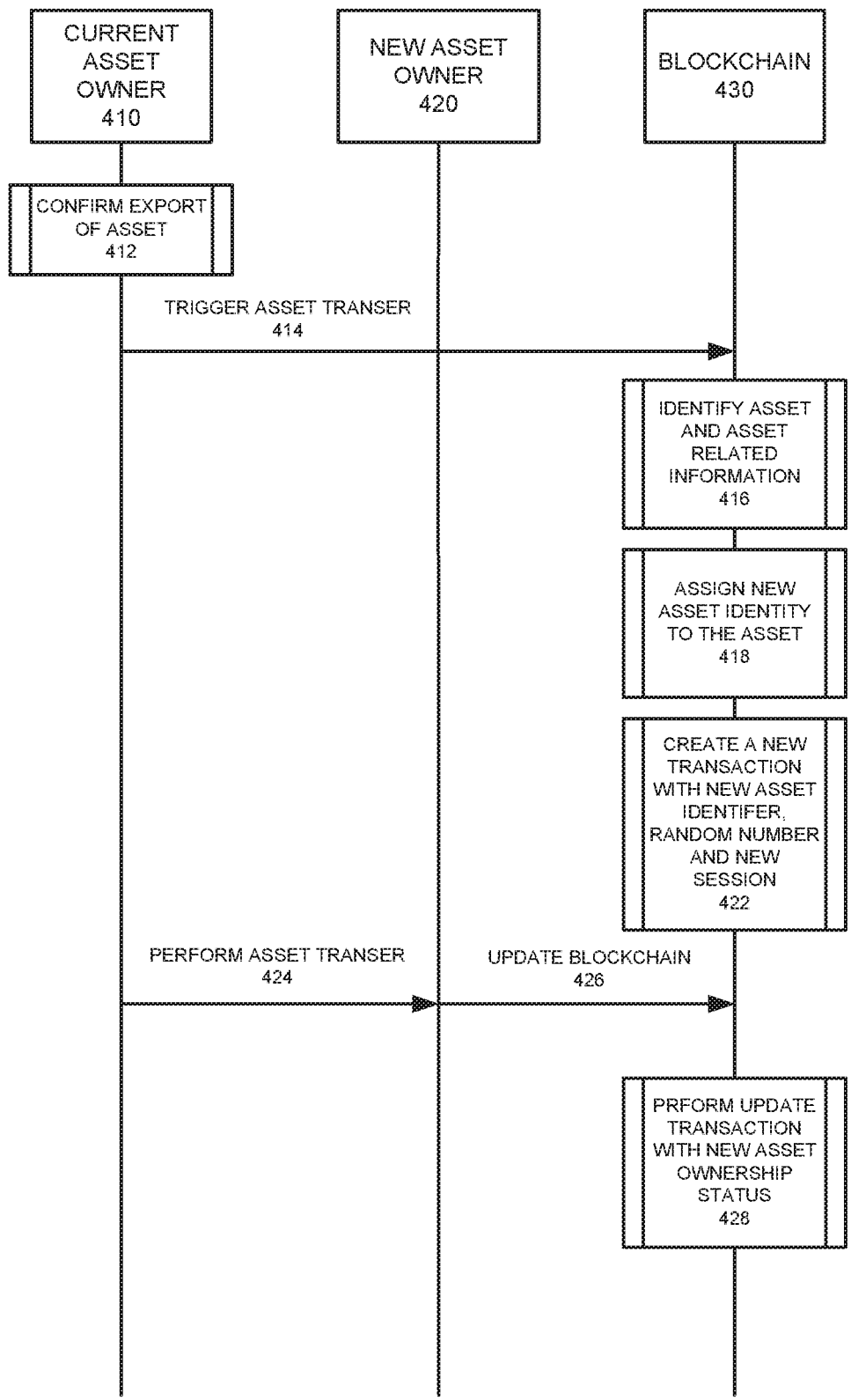
FIG. 4 illustrates a system messaging diagram for performing asset transfer operations with a blockchain architecture, according to example embodiments.

FIG. 4 illustrates a system messaging diagram for performing asset transfer operations with a blockchain architecture, according to example embodiments. Referring to FIG. 4, the system configuration 400 may include a current asset owner 410 identifying a purchase, sale and/or transfer to another future owner and confirming an export of the asset 412. The export trigger may be a trigger based on an export identifier with information regarding the owner, the future owner and other information 414 necessary to trigger a new blockchain transaction. The transfer may cause the asset identification information to be confirmed 416, a new identity to be assigned to the asset 418 and a new transaction to be created 422 with the new asset identifier and the random number assigned to the transferor and the transferee as part of the new session and the new transaction 422. The asset may be transferred 424 and confirmation may be used to be included in the new transaction update 426. The update can be performed with new asset ownership status information 428.

Figure 5A:
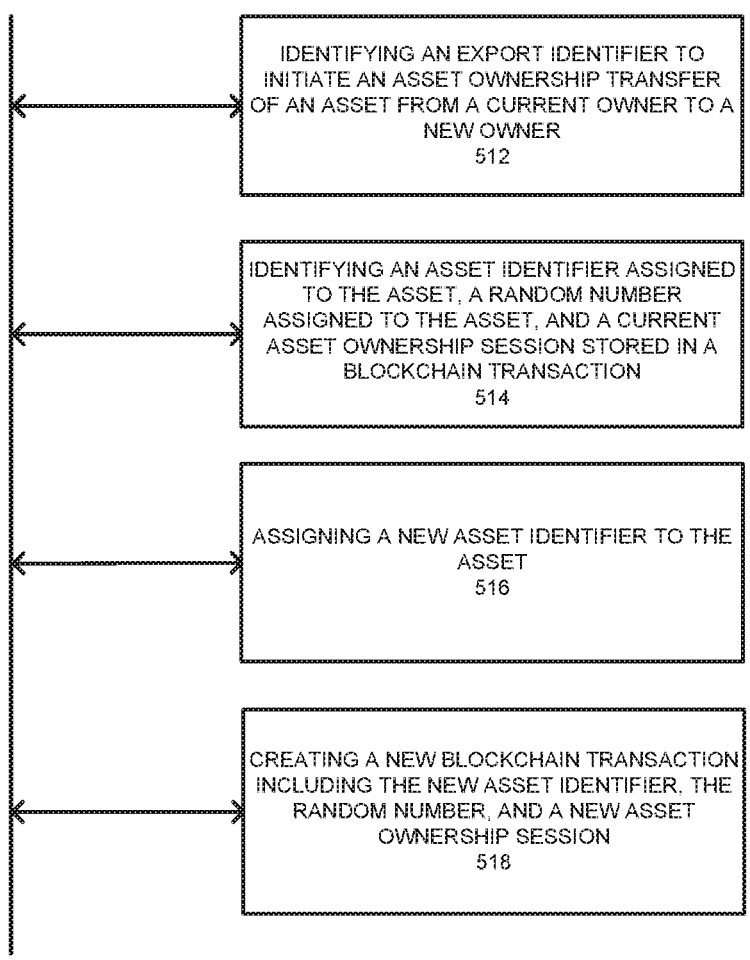
FIG. 5A illustrates a flow diagram of an example method of asset transfer management via a blockchain, according to example embodiments.

FIG. 5A illustrates a flow diagram of an example method of asset transfer management via a blockchain, according to example embodiments. Referring to FIG. 5A, the method 500 may include receiving an export identifier to initiate an asset ownership transfer of an asset from a current owner to a new owner 512, identifying an asset identifier assigned to the asset, a random number assigned to the asset 514, and a current asset ownership session stored in a blockchain transaction, assigning a new asset identifier to the asset 516, and creating a new blockchain transaction comprising the new asset identifier, the random number, and a new asset ownership session 518.

The export identifier may include a hash of the new asset identifier, an import identifier and the random number. The method may also include identifying the import identifier associated with the new owner, and the import identifier triggers a beginning of the new asset ownership session. The asset identifier may be inactive during the new asset ownership session, and the new asset identifier is active during the new asset ownership session. Responsive to the new asset ownership session beginning, a new encryption key may be created and used during asset transfer operations conducted during the new asset ownership session.

Figure 5B:
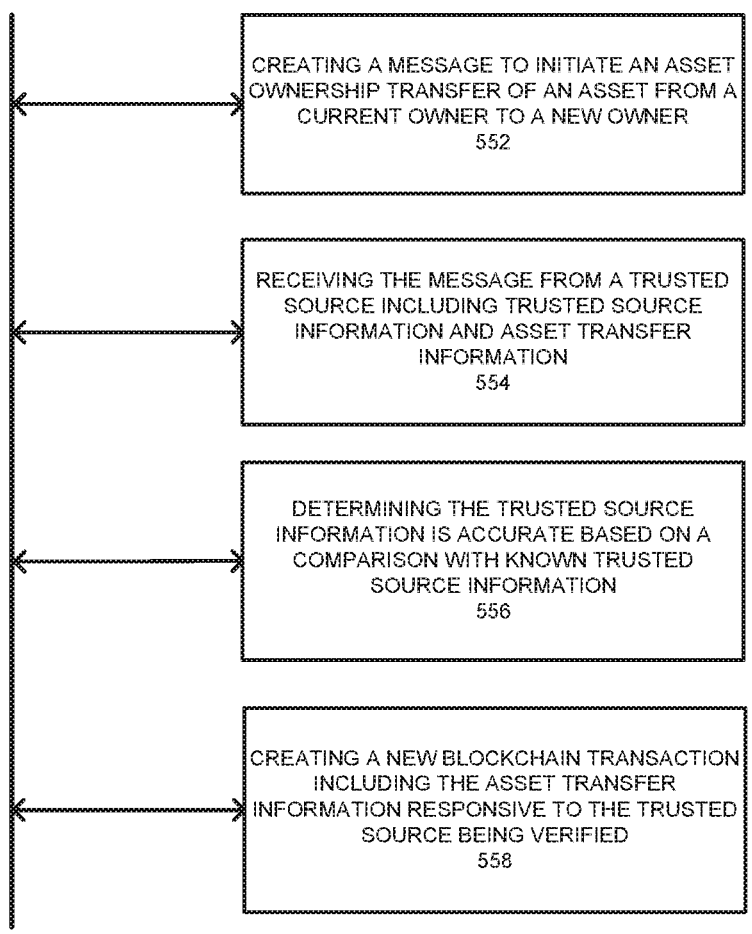
FIG. 5B illustrates a flow diagram of another example method of method of asset transfer management via a blockchain, according to example embodiments.

FIG. 5B illustrates a flow diagram of another example method of method of asset transfer management via a blockchain, according to example embodiments. In this method 550, the operations may include creating a message to initiate an asset ownership transfer of an asset from a current owner to a new owner 552, receiving the message from a trusted source including trusted source information and asset transfer information 554, determining the trusted source information is accurate based on a comparison with known trusted source information 556, and creating a new blockchain transaction including the asset transfer information responsive to the trusted source being verified 558. In addition to performing an asset transfer operation based on import and export triggers and session provenance data necessary to verify the validity of the parties and the asset, a message from a trusted source can be used as a mechanism to verify the source as a trusted source based on known and/or expected information included in the message. Once the information is verified, the asset transfer blockchain transaction may be created and committed to the blockchain to validate the transfer of the asset.

Figure 5C:
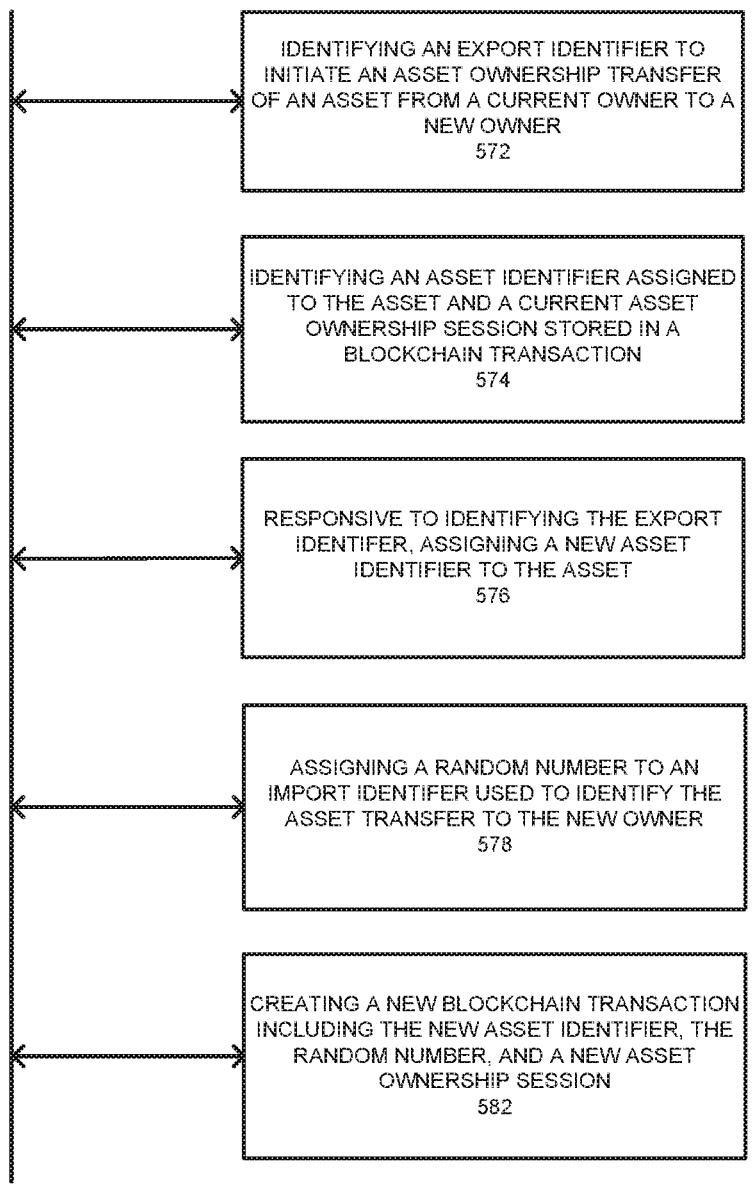
FIG. 5C illustrates a flow diagram of yet another example method of asset transfer management via a blockchain, according to example embodiments.

FIG. 5C illustrates a flow diagram of yet another example method of method of asset transfer management via a blockchain, according to example embodiments. In this method 570, the operations include receiving an export identifier to initiate an asset ownership transfer of an asset from a current owner to a new owner 572, identifying an asset identifier assigned to the asset and a current asset ownership session stored in a blockchain transaction 574, responsive to identifying the export identifier, assigning a new asset identifier to the asset 576, assigning a random number to an import identifier used to identify the asset transfer to the new owner 578, and creating a new blockchain transaction comprising the new asset identifier, the random number, and a new asset ownership session 582.

Figure 6A:
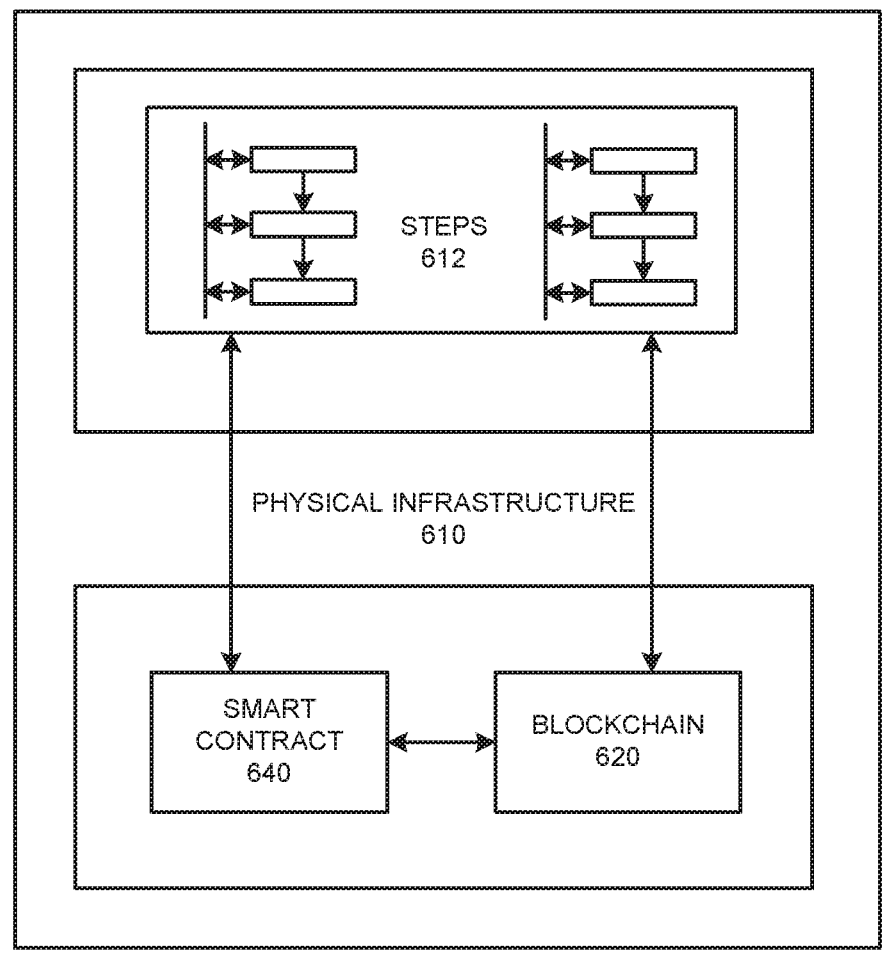
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600 includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
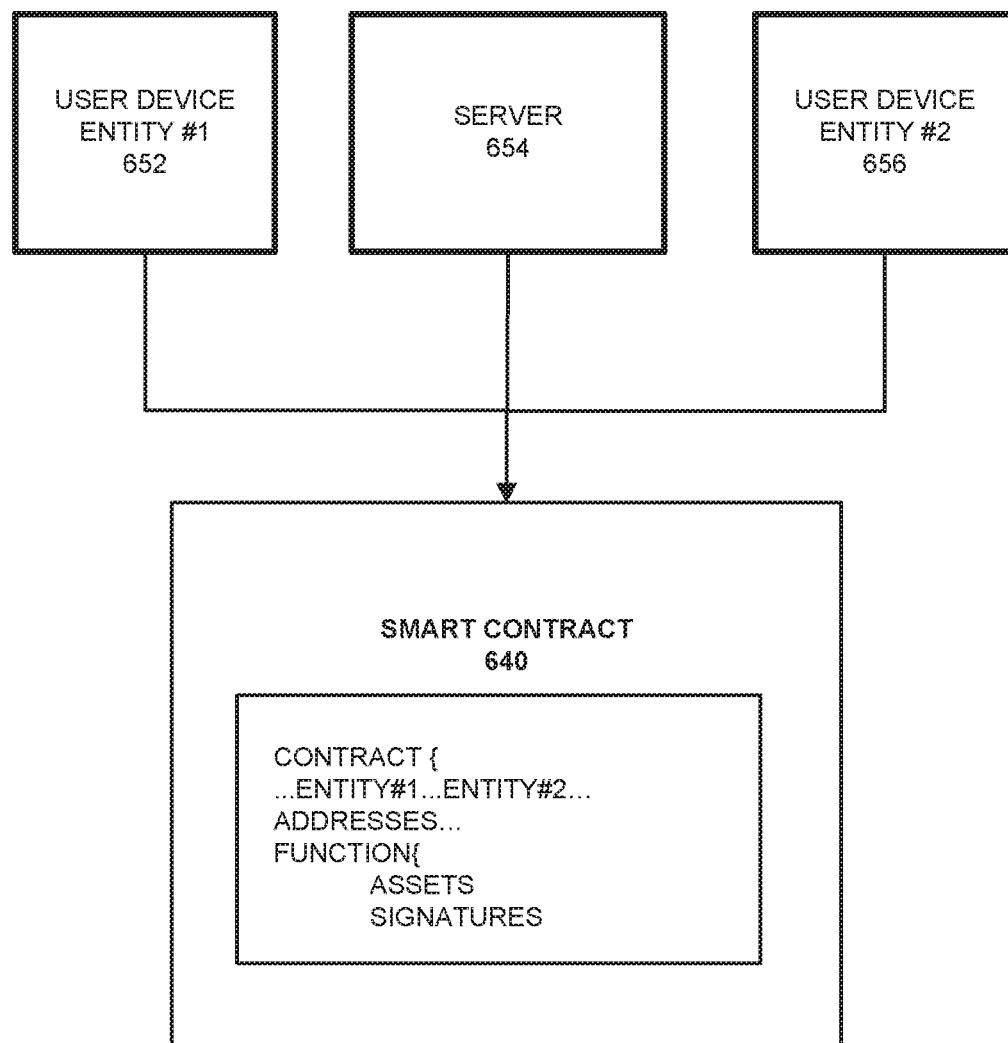
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650 may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
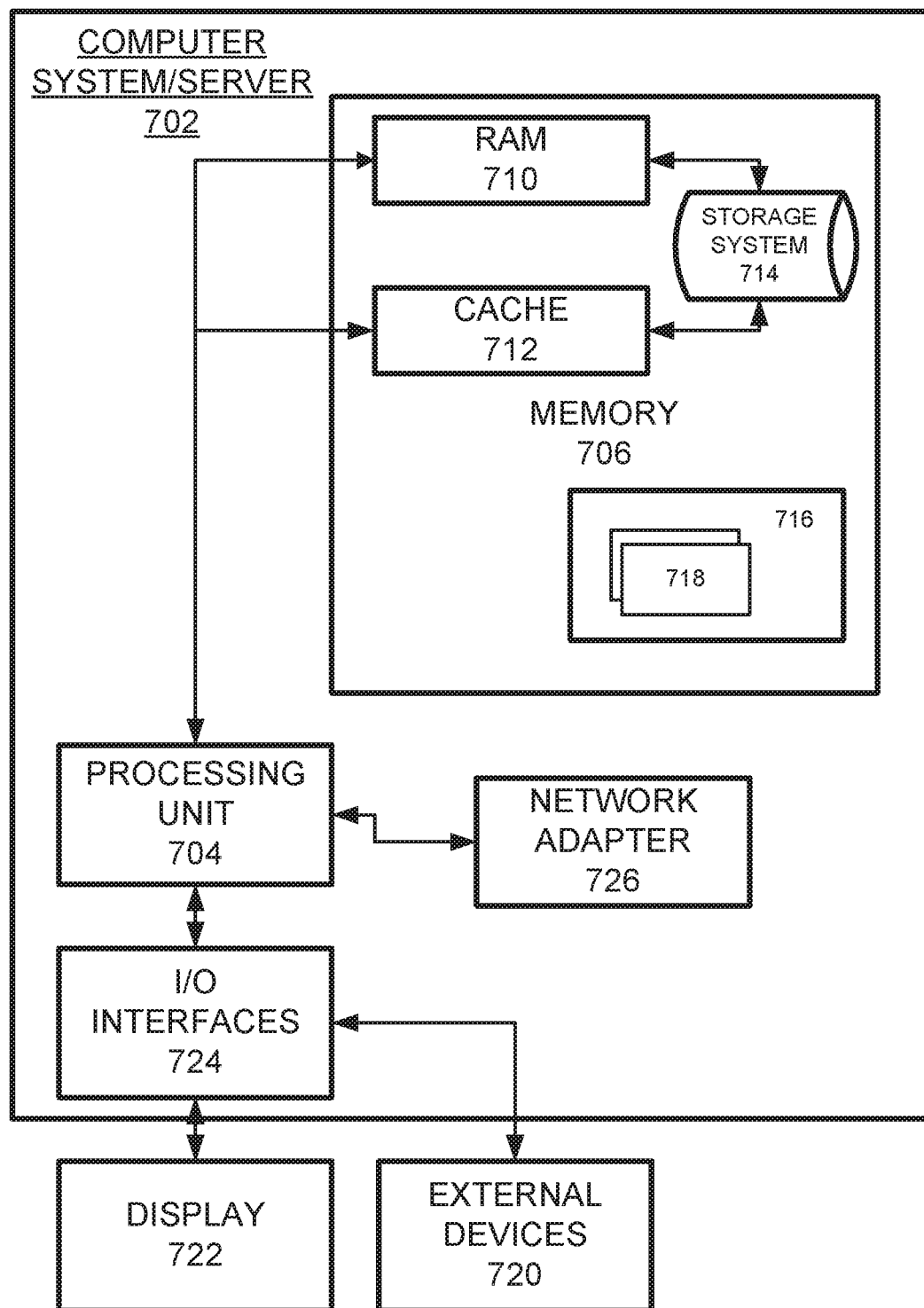
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method of concealing identity information from a successive owner in a blockchain network, the method comprising:
    receiving an export identifier to initiate an asset ownership transfer of an asset from a current owner to a new owner;
    identifying an asset identifier assigned to the asset and a current asset ownership session stored in a blockchain transaction of a previous transfer operation to the current owner;
    responsive to identifying the asset identifier, assigning a new asset identifier to the asset;
    assigning a random number to an import identifier used to identify the asset transfer to the new owner;
    creating a new blockchain transaction comprising the new asset identifier, the random number, and a new asset ownership session of the new owner;
    incorporating the new blockchain transaction into the blockchain network.

2. The method of claim 1, wherein the export identifier comprises a hash of the new asset identifier and the import identifier associated with the current owner.

3. The method of claim 2, further comprising:
    identifying the random number assigned to the import identifier associated with the new owner is different from a random number previously assigned to the export identifier.

4. The method of claim 3, further comprising:
    responsive to identifying the import identifier, triggering a beginning of the new asset ownership session.

5. The method of claim 4, wherein the asset identifier is inactive during the new asset ownership session.

6. The method of claim 4, wherein the new asset identifier is active during the new asset ownership session.

7. The method of claim 4, further comprising:
    responsive to the new asset ownership session beginning, creating a new encryption key; and
    encrypting asset information associated with the asset with the new encryption key during an asset transfer operation conducted during the new asset ownership session.

8. A system of concealing identity information from a successive owner in a blockchain network, the system comprising:
    a computing node configured to
    receive an export identifier to initiate an asset ownership transfer of an asset from a current owner to a new owner;
    identify an asset identifier assigned to the asset and a current asset ownership session stored in a blockchain transaction of a previous transfer operation to the current owner;
    responsive to the asset identifier being identified, assign a new asset identifier to the asset;
    assign a random number to an import identifier used to identify the asset transfer to the new owner;
    create a new blockchain transaction comprising the new asset identifier, the random number, and a new asset ownership session of the new owner;
    incorporating the new blockchain transaction into the blockchain network.

9. The system of claim 8, wherein the export identifier comprises a hash of the new asset identifier and the import identifier associated with the current owner.

10. The system of claim 9, wherein the computing node is further configured to
    identify the random number assigned to the import identifier associated with the new owner is different from a random number previously assigned to the export identifier.

11. The system of claim 10, wherein the computing node is further configured to
    responsive to the import identifier being identified, trigger a beginning of the new asset ownership session.

12. The system of claim 11, wherein the asset identifier is inactive during the new asset ownership session.

13. The system of claim 11, wherein the new asset identifier is active during the new asset ownership session.

14. The system of claim 11, wherein the computing node is further configured to
    responsive to the new asset ownership session being initiated, create a new encryption key; and
    encrypt asset information associated with the asset with the new encryption key during an asset transfer operation conducted during the new asset ownership session.

15. A non-transitory computer readable storage medium, of concealing identity information from a successive owner in a blockchain network, the non-transitory computer readable medium configured to store instructions that when executed cause a processor to perform:
    receiving an export identifier to initiate an asset ownership transfer of an asset from a current owner to a new owner;
    identifying an asset identifier assigned to the asset and a current asset ownership session stored in a blockchain transaction of a previous transfer operation to the current owner;
    responsive to identifying the asset identifier, assigning a new asset identifier to the asset;
    assigning a random number to an import identifier used to identify the asset transfer to the new owner;
    creating a new blockchain transaction comprising the new asset identifier, the random number, and a new asset ownership session of the new owner;
    incorporating the new blockchain transaction into the blockchain network.

16. The non-transitory computer readable storage medium configured of claim 15, wherein the export identifier comprises a hash of the new asset identifier and the import identifier associated with the current owner.

17. The non-transitory computer readable storage medium of claim 16, wherein the processor is further configured to perform:

identifying the random number assigned to the import identifier associated with the new owner is different from a random number previously assigned to the export identifier.

18. The non-transitory computer readable storage medium of claim 17, wherein the processor is further configured to perform:

responsive to identifying the import identifier, triggering a beginning of the new asset ownership session.

19. The non-transitory computer readable storage medium of claim 18, wherein the asset identifier is inactive during the new asset ownership session.

20. The non-transitory computer readable storage medium of claim 19, wherein the processor is further configured to perform:

responsive to the new asset ownership session beginning, creating a new encryption key; and encrypting asset information associated with the asset with the new encryption key during an asset transfer operation conducted during the new asset ownership session, and wherein the new asset identifier is active during the new asset ownership session.

* * * * *